US007000701B2

(12) United States Patent
Todd et al.

(10) Patent No.: US 7,000,701 B2
(45) Date of Patent: Feb. 21, 2006

(54) COMPOSITIONS AND METHODS FOR WEIGHTING A BREAKER COATING FOR UNIFORM DISTRIBUTION IN A PARTICULATE PACK

(75) Inventors: Bradley L. Todd, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 239 days.

(21) Appl. No.: 10/715,799

(22) Filed: Nov. 18, 2003

(65) Prior Publication Data

US 2005/0103496 A1    May 19, 2005

(51) Int. Cl.
*E21B 43/04*    (2006.01)
*E21B 37/00*    (2006.01)

(52) U.S. Cl. ............... 166/278; 166/300; 166/311; 507/201; 507/241; 507/260; 507/270; 507/271; 507/277; 507/902

(58) Field of Classification Search ............... 166/276, 166/278, 300, 311; 507/210, 224, 225, 241, 507/260, 270, 271, 277, 902, 921
See application file for complete search history.

(56) References Cited

U.S. PATENT DOCUMENTS

| 5,102,558 | A | * | 4/1992 | McDougall et al. | 507/260 |
| 5,164,099 | A | * | 11/1992 | Gupta et al. | 507/214 |
| 5,217,074 | A | * | 6/1993 | McDougall et al. | 166/300 |
| 5,370,184 | A | * | 12/1994 | McDougall et al. | 166/278 |
| 5,604,186 | A | | 2/1997 | Hunt et al. | 507/204 |
| 5,981,447 | A | * | 11/1999 | Chang et al. | 507/271 |
| 6,225,262 | B1 | | 5/2001 | Irwin et al. | |
| 6,357,527 | B1 | | 3/2002 | Norman et al. | 166/300 |
| 6,422,314 | B1 | * | 7/2002 | Todd et al. | 166/312 |
| 6,569,814 | B1 | * | 5/2003 | Brady et al. | 507/201 |
| 6,818,594 | B1 | * | 11/2004 | Freeman et al. | 507/101 |
| 6,840,318 | B1 | * | 1/2005 | Lee et al. | 166/293 |
| 6,938,693 | B1 | * | 9/2005 | Boney et al. | 166/280.1 |
| 2002/0036088 | A1 | * | 3/2002 | Todd | 166/300 |

FOREIGN PATENT DOCUMENTS

EP    1 152 121 A2    11/2001

OTHER PUBLICATIONS

SPE 68968, "Laboratory Devices for Testing of Delayed-Breaker Solutions on Horizontal Wellbore Filter Cakes," Brad Todd and Rob Murphy, May 2001.
Foreign communication from a related counterpart application dated May 24, 2005.

* cited by examiner

*Primary Examiner*—George Suchfield
(74) *Attorney, Agent, or Firm*—Robert A. Kent; Baker Botts

(57) ABSTRACT

The present invention involves methods and compositions for treating subterranean formations, and more specifically, relates to improved methods and compositions for degrading filter cake deposited in a subterranean formation by effecting a uniform distribution of a filter cake breaker. One embodiment of the present invention provides a weighted encapsulated breaker comprising a breaker material; and, a coating material comprising a polymer material and a filler material having a specific gravity of at least about 6.5.

36 Claims, No Drawings

COMPOSITIONS AND METHODS FOR WEIGHTING A BREAKER COATING FOR UNIFORM DISTRIBUTION IN A PARTICULATE PACK

BACKGROUND

The present invention involves methods and compositions for treating subterranean formations, and more specifically, relates to improved methods and compositions for degrading filter cake deposited in a subterranean formation by effecting a uniform distribution of a filter cake breaker.

Filter cake, the residue deposited on a permeable medium when servicing fluids contact the medium under pressure, is formed in a variety of subterranean operations such as drilling, fracturing, and gravel packing. A filter cake is often desirable, at least temporarily, in subterranean operations as it may act to stem the flow of a servicing fluid from its desired location, to the surrounding subterranean formation. For instance, where the servicing fluid is a drilling fluid, a filter cake formed on the wall of the well bore may act to keep the drilling fluid in its desired location, in the annulus between the well bore and the drill pipe, rather than allowing the drilling fluid to leach off into the surrounding formation. Losses of drilling, fracturing, gravel transport, and other servicing fluids into the formation represents an increased expense and, loss of too much fluid may damage producing zones in the formation. Moreover, in soft or poorly consolidated sandstone formations, the presence of a filter cake may add strength and stability to the formation surfaces on which the filter cake forms. Without the filter cake in place and differential pressure applied to the filter cake, poorly consolidated or unconsolidated formations may suffer from hole collapse. Keeping the drilled bore hole open is essential for the installation of completion equipment.

Sand control operations, such as gravel packing, are performed after a well bore is drilled. One common type of gravel packing operation, referred to as "open hole" gravel packing, involves placing a gravel pack screen in the well bore and packing the surrounding annulus between the screen and the well bore with gravel of a specific size designed to prevent the passage of formation sand. The gravel pack screen is generally a filter assembly used to support and retain the gravel placed during gravel pack operation. A wide range of screen sizes and configurations are available to suit the characteristics of the gravel pack gravel used. Similarly, a wide range of sizes of gravel is available to suit the characteristics of the unconsolidated or poorly consolidated particulates in the subterranean formation. The resulting structure presents a barrier to migrating sand from the formation while still permitting fluid flow.

When installing the gravel pack, the gravel is carried to the formation in the form of a slurry by mixing the gravel with a transport fluid. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing. Often, gravel packs are placed along a well bore having a filter cake on its walls.

While filter cakes may be beneficial during treatment operations, it is generally necessary to remove filter cakes from producing zones prior to the well being placed onto production. The removal of filter cakes from producing formations has previously been accomplished by including an acid-soluble particulate solid bridging agent in the material that forms the filter cake. Such an acid-degradable filter cake could then be treated by placing an acid solution in contact with the filter cake and allowing that solution to remain in contact for a period of time sufficient to dissolve the bridging particles and, thus, degrade the filter cake. These post-completion acid treatments are generally placed through coil tubing and are expensive and time consuming to apply.

Post completion, filter cake cleanup treatments have only been partially successful because of the gravel pack and sand screen act as a barrier to contacting the filter cake with the cleanup solution. In addition, the highly reactive nature of the acid causes instantaneous degradation of the filter cake in those areas where the contact occurs which leads to high localized fluid loss, making the remainder of the treatment difficult to apply uniformly.

One conventional method that attempts to overcome that problem involves placing a slow reacting or delayed material suitable for degrading a filter cake, e.g., an oxidizer, ester, enzyme, or the like (hereinafter a "breaker") in the gravel pack carrier-fluid in hopes that the breaker will be uniformly distributed throughout the gravel pack. However, because the breaker is dissolved in the gravel pack carrier fluid, and not all of the gravel pack carrier fluid remains in the subterranean formation, much of the breaker that is pumped gets circulated out of the well bore and does not interact with the filter cake as desired. Improved methods deliver the breaker as a particle that deposits with the gravel pack since all of the particles remain in the screen/well bore annulus.

It is also known in the art that a breaker may be encapsulated to delay its release. Encapsulating a breaker would allow it to be delivered as a particle that could be deposited with the gravel pack. By so delaying the release of the breaker the user is able to place the breaker in a subterranean formation and to have some time before the encapsulated material begins to substantially act as a breaker. However, such encapsulated breakers known in the art generally exhibit low densities, less than about 1.8. When the encapsulated breaker particles are sent into a subterranean formation as part of a gravel packing operation, they often do not deposit uniformly throughout the pack. This is because the specific gravity of the gravel is generally at least about 2.5. This is especially problematic in horizontal wells where there would be a risk of the gravel depositing along the bottom of the well bore and the lighter encapsulated particles being carried further along the well bore.

SUMMARY OF THE INVENTION

The present invention involves methods and compositions for treating subterranean formations, and more specifically, relates to improved methods and compositions for degrading filter cake deposited in a subterranean formation by effecting a uniform distribution of a filter cake breaker.

One embodiment of the present invention provides a method of removing a filter cake comprising encapsulating a breaker material in a coating comprising a polymer material and a filler material having a specific gravity of at least about 6.5 to create a weighted encapsulated breaker; placing the weighted encapsulated breaker into a subterranean formation as part of a gravel pack substantially adjacent to a filter cake; allowing the breaker material to diffuse from the weighted encapsulated breaker; and degrade a portion of the filter cake.

Another embodiment of the present invention provides a method of placing a gravel pack in a subterranean formation comprising the steps of providing a gravel pack composition comprising a transport fluid, gravel particles, and a weighted encapsulated breaker material wherein the weighted encapsulated breaker material comprises a breaker material and a coating material comprising a polymer material and a filler material having a specific gravity of at least about 6.5; and, introducing the gravel pack composition into a well bore so that the gravel particles form a gravel pack substantially adjacent to the well bore.

Still another embodiment of the present invention provides a weighted encapsulated breaker comprising a breaker material; and, a coating material comprising a polymer material and a filler material having a specific gravity of at least about 6.5.

The features and advantages of the present invention will be readily apparent to those skilled in the art upon a reading of the description of the preferred embodiments that follows.

DETAILED DESCRIPTION

The present invention involves methods and compositions for treating subterranean formations, and more specifically, relates to improved methods and compositions for degrading filter cake deposited in a subterranean formation by effecting a uniform distribution of a filter cake breaker.

Some embodiments of the compositions of the present invention provide a weighted encapsulated breaker comprising a breaker material encapsulated in a coating comprising a polymer material and a filler material having a specific gravity of at least about 6.5. The weighted encapsulated breakers of the present invention are particularly suitable for use in gravel packing operations.

The breaker material may be substantially any material that does not adversely interact or chemically react with the encapsulation coating to destroy its utility. The breaker material can comprise, for example: enzymes such as hemi-cellulase; oxidizers such as sodium or ammonium persulfate; organic acids, such as citric acid; chelating agents, such as EDTA; and, mixtures of two or more materials and the like.

Polymer materials suitable for use in the present invention may comprise a partially hydrolyzed acrylic material. Preferred polymer materials comprise partially hydrolyzed acrylic material in an aqueous based form that is crosslinked with either an aziridine prepolymer or a carbodiimide. The term "partially hydrolyzed acrylic material" as used herein means any of the vinyl acrylic latex polymers containing from about 0–60% by weight monovinyl aromatic content as styrene, from about 5–25% by weight alpha, beta unsaturated carboxylic acid content and from about 15–95% by weight alkyl acrylate or methacrylate ester content. The unsaturated carboxylic acid may comprise, for example, acrylic acid or methyl acrylic acid or mixtures thereof. The alkyl acrylate or methacrylate ester may comprise, for example, ethyl butyl or 2-ethylhexylacrylate, methyl, butyl or isobutyl methacrylate or mixtures thereof. Suitable vinyl acrylic latex polymers may be stabilized by the addition of appropriate nonionic or anionic/nonionic surfactant systems in accordance with well known methods for preparing and stabilizing latex polymer systems. Vinyl acrylic latex polymers of the type described above are commercially available from, for example, Rohm and Haas Company, Philadelphia, Pa. or S. C. Johnson Wax, Racine, Wis. Suitable aziridine prepolymers may comprise, for example, pentaerythritol-tris-[β-(aziridinly) propionate]. Suitable carbodiimides may comprise, for example, 1,3-dicyclohexylcarbodiimide.

To create the weighted encapsulated breakers of the present invention, a polymer material is admixed with a particulate micron sized filler material to form the coating. The filler material may be admixed with the polymer prior to or simultaneously with the coating of the breaker. The polymer material is admixed with the filler material in an amount such that the filler material comprises from about 0.5% to about 85% by weight of the total coating. Preferably, the filler material comprises from about 60% to about 80% by weight of the total coating. The filler material may have a median particle size of from about 1 micron to about 15 microns. Preferably the filler material has a median particle size of from about 2 to about 3 microns and preferably contains less than 33 percent, by weight, sub-micron sized particles. The presence of substantial quantities of sub-micron sized particles has been found to adversely effect the performance of the weighted encapsulated breaker of the present invention, potentially resulting in unregulated release of the breaker after exposure to a liquid. The addition of the in-excess-of one micron mean diameter particles to the polymer coating may create imperfections in the coating in the form of small weep-holes or channels that facilitate the diffusion process.

Generally, the weighted encapsulated breaker is prepared having a membrane coating of the crosslinked partially hydrolyzed acrylic and filler material emulsion coating mixture of a certain thickness and permeability to obtain the desired controlled release of the breaker for a particular fracturing fluid. The quantity of and size of the particulate filler material present in the sprayed coating may significantly effect the permeability of the membrane created. The size of the encapsulated breaker may vary depending upon the desired amount of breaker to be released and the desired rate at which the breaker is to be released. For example, the thicker the membrane, generally the slower the release since it takes longer for the aqueous fluid in the servicing fluid to permeate the encapsulated breaker and affect dissolution of the breaker and diffusion back through the coating. Changing the particle size of the filler material present in the coating however can modify this.

The filler material may be any inert particulate of an appropriate particle size and density. The prior art teaches that the filler material is generally silica, a relatively low specific gravity material. Fillers suitable for use in the present invention are generally high specific gravity compounds. Such filler materials include those materials containing bismuth, tungsten-iron compounds, tungsten-nickel-iron compounds, tin, tin compounds (such as, for example tin oxide), tungsten compounds (such as, for example, calcium tungstate), and other metals and their compounds. The filler may be chosen so that it does not adversely effect the operation of the breaker, the degradation of the coating, or the subterranean treatment with which it is used, such as a gravel pack. The filler material is chosen based primarily on its specific gravity. The filler material acts to increase the weight of the coating and is added in an amount sufficient to create a weighted encapsulated breaker particle having a specific gravity close to that of the other particulates, such as proppant or gravel, with which the weighted encapsulated breaker is used.

A crosslinking agent may be admixed with the partially hydrolyzed acrylic and filler material in an amount of from about 0.5 to about 6.5 percent by weight of total coating weight. Preferably, the crosslinking agent is present in an amount of from about 1.5% to 2.5% by weight of total coating weight. Examples of suitable crosslinkers include, but are not limited to, pentaerythritol tris[3-(1-aziridinyl)

propionate], TAZO, Xama 7, trimethylolpropane-tri-baziridinyl-propionate, N,N'-hexamethylene-1,6-bis(1-aziridine carboxamide).

The weighted encapsulated breaker of the present invention may be made using known microencapsulation processes. One such process is a fluidized bed method known in the art as a Wurster process. A known modification of the Wurster process modifies a traditional fluidized bed to use a top spray method. Fluidized bed equipment suitable for effecting the coating is available from, for example, Glatt Air Techniques, Inc. of Ramsey, N.J.

When used in a fluidized bed coating process, the coating is advantageously used in the form of an aqueous or solvent-based solution or dispersion that may contain from about 45% to about 75% percent by weight solids to facilitate spray coating of the breaker. In some embodiments, from about 20% to about 85% of the total weight of the encapsulated breaker will be the weight of the coating. In still other embodiments, from about 40% to about 65% of the total weight of the encapsulated breaker will be the weight of the coating. It is within the ability of one skilled in the art with the benefit of this disclosure to consider, among other things, the temperature of the formation, the make-up and thickness of the filter cake, and the desired time the release of the breaker is to be delayed, and determine the amount of breaker needed to substantially degrade the filter cake at issue and the amount of coating needed to effectively delay the breaker's release. The weighted encapsulated breakers of the present invention also may be used with quantities of unencapsulated breakers, depending upon the specific release time desired.

In the present invention, the breaker encapsulated within the coating membrane is released from within the membrane by diffusion. Fluid moves from outside the membrane through the membrane coating and into the core of the particle whereupon it dissolves the breaker. The breaker solution concentration within the membrane slowly becomes greater than the breaker solution concentration outside the membrane and the breaker diffuses through the membrane and into the fracturing fluid whereupon it subsequently breaks the fracturing fluid.

Where the weighted breakers of the present invention are used in a sand control operation such as gravel packing, the gravel pack may be formed using any technique known in the art. In one technique, gravel particles and weighted breaker particles are substantially slurried into a delivery fluid and pumped into the well bore substantially adjacent to the zone of the subterranean formation that has been fitted with a gravel pack screen. The delivery fluid may be any viscosified fluid known in the art for use in the placement of gravel packs; the delivery fluid may be either a water-based or an oil-based fluid. It is within the ability of one skilled in the art to select a suitable delivery fluid. The gravel material and weighted breaker particles are separated from the slurry as the delivery fluid is forced into the well bore and through the screen. The gravel particles and weighted breaker particles are not able to flow through the mesh of the installed gravel pack screen and are left behind, thus forming a gravel pack. Once the gravel pack is formed from such particles, the coating allows the gradual release of breaker material that substantially degrades the filter cake.

To facilitate a better understanding of the present invention, the following examples of preferred embodiments are given. In no way should the following examples be read to limit the scope of the invention.

EXAMPLES

Comparative Example 1

A breaker having a specific gravity of 2.0, coated with particulate solids made up of 60% by weight partially hydrolyzed acrylic (specific gravity 1.05) and 40% silica particles (specific gravity 2.6). The coating is built up to a thickness such that the coating is 40% of the total weight of the encapsulated particle. The resulting net specific gravity of the encapsulated particle is 1.7.

Example 1

A breaker having a specific gravity of 2.0, coated with particulate solids made up of weight partially hydrolyzed acrylic (specific gravity 1.05) and bismuth particle (specific gravity 10) at a concentration where the relative volumes of particle is set by the Comparative Example 1. The coating is built up to same thickness as resulted from the Comparative Example 1. The resulting net specific gravity of the encapsulated particle is 2.6.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of removing a filter cake comprising the steps of: providing a weighted encapsulated breaker comprising a breaker material that is encapsulated in a coating that comprises a polymer material and a filler material having a specific gravity of at least about 6.5; placing the weighted encapsulated breaker into a subterranean formation as part of a gravel pack substantially adjacent to a filter cake; allowing the breaker material to diffuse from the weighted encapsulated breaker; and degrading a portion of the filter cake.

2. The method of claim 1 wherein the breaker material is an enzyme, an oxidizer, an organic acid, a chelating agent, or a combination thereof.

3. The method of claim 1 wherein the breaker material is hemicellulase, sodium persulfate, ammonium persulfate, citric acid, EDTA, or combinations thereof.

4. The method of claim 1 wherein the polymer material comprises a partially hydrolyzed acrylic material.

5. The method of claim 1 wherein the polymer material is a partially hydrolyzed acrylic material crosslinked with an aziridine prepolymer, a partially hydrolyzed acrylic material crosslinked with a carbodiimide, or a combination thereof.

6. The method of claim 1 wherein the coating comprises from about 0.5 weight percent to about 85 weight percent filler material.

7. The method of claim 1 wherein the coating comprises from about 60 weight percent to about 80 weight percent filler material.

8. The method of claim 1 wherein the filler material has a median particle size of from about 1 micron to about 15 microns.

9. The method of claim 1 wherein the filler material has a median particle size of from about 2 micron to about 3 microns.

10. The method of claim 1 wherein the filler material is bismuth, tungsten, iron, nickel, tin, or a combination thereof.

11. The method of claim 1 wherein the coating further comprises a crosslinking agent.

12. The method of claim 10 wherein crosslinking agent present in an amount of from about 1.5% to 2.5% by weight of total coating weight.

13. A method of using a portion of a gravel pack to degrade a portion of a filter cake comprising the steps of: providing a weighted encapsulated breaker comprising a breaker material that is encapsulated in a coating that comprises a polymer material and a filler material having a specific gravity of at least about 6.5; providing a gravel material and a delivery fluid; slurrying the weighted encapsulated breaker and gravel into a delivery fluid to create a gravel packing composition; introducing the gravel packing composition to a well bore having a filter cake thereon so that a gravel pack is formed substantially adjacent to the filter cake; allowing the breaker material to diffuse from the encapsulated breaker; and degrading a portion of the filter cake.

14. The method of claim 13 wherein the breaker material is an enzyme, an oxidizer, an organic acid, a chelating agent, or a combination thereof.

15. The method of claim 13 wherein the breaker material is hemicellulase, sodium persulfate, ammonium persulfate, citric acid, EDTA, or combinations thereof.

16. The method of claim 13 wherein the polymer material comprises a partially hydrolyzed acrylic material.

17. The method of claim 13 wherein the polymer material is a partially hydrolyzed acrylic material crosslinked with an aziridine prepolymer, a partially hydrolyzed acrylic material crosslinked with a carbodiimide, or a combination thereof.

18. The method of claim 13 wherein the coating comprises from about 0.5 weight percent to about 85 weight percent filler material.

19. The method of claim 13 wherein the coating comprises from about 60 weight percent to about 80 weight percent filler material.

20. The method of claim 13 wherein the filler material has a median particle size of from about 1 micron to about 15 microns.

21. The method of claim 13 wherein the filler material has a median particle size of from about 2 micron to about 3 microns.

22. The method of claim 13 wherein the filler material is bismuth, tungsten, iron, nickel, tin, or a combination thereof.

23. The method of claim 13 wherein the coating further comprises a crosslinking agent.

24. The method of claim 23 wherein crosslinking agent present in an amount of from about 1.5% to 2.5% by weight of total coating weight.

25. A method of placing a gravel pack in a subterranean formation comprising the steps of: providing a gravel pack composition comprising a transport fluid, gravel particles, and a weighted encapsulated breaker material wherein the weighted encapsulated breaker material comprises a breaker material and a coating material comprising a polymer material and a filler material having a specific gravity of at least about 6.5; and, introducing the gravel pack composition into a well bore so that the gravel particles form a gravel pack substantially adjacent to the well bore.

26. The method of claim 25 wherein the breaker material is an enzyme, an oxidizer, an organic acid, a chelating agent, or a combination thereof.

27. The method of claim 25 wherein the breaker material is hemicellulase, sodium persulfate, ammonium persulfate, citric acid, EDTA, or combinations thereof.

28. The method of claim 25 wherein the polymer material comprises a partially hydrolyzed acrylic material.

29. The method of claim 25 wherein the polymer material is a partially hydrolyzed acrylic material crosslinked with an aziridine prepolymer, a partially hydrolyzed acrylic material crosslinked with a carbodiimide, or a combination thereof.

30. The method of claim 25 wherein the coating comprises from about 0.5 weight percent to about 85 weight percent filler material.

31. The method of claim 25 wherein the coating comprises from about 60 weight percent to about 80 weight percent filler material.

32. The method of claim 25 wherein the filler material has a median particle size of from about 1 micron to about 15 microns.

33. The method of claim 25 wherein the filler material has a median particle size of from about 2 micron to about 3 microns.

34. The method of claim 25 wherein the filler material is bismuth, tungsten, iron, nickel, tin, or a combination thereof.

35. The method of claim 25 wherein the coating further comprises a crosslinking agent.

36. The method of claim 35 wherein crosslinking agent present in an amount of from about 1.5% to 2.5% by weight of total coating weight.

* * * * *